United States Patent
Tran et al.

(10) Patent No.: US 8,094,012 B1
(45) Date of Patent: Jan. 10, 2012

(54) ACTIVE COMPOSITE RFID TAG FOR OBJECT LOCALIZATION AND INSTRUCTION

(75) Inventors: Nghia Tran, San Diego, CA (US); Michael R. Blackburn, Encinitas, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 446 days.

(21) Appl. No.: 12/466,645

(22) Filed: May 15, 2009

(51) Int. Cl.
*G08B 1/08* (2006.01)
(52) U.S. Cl. ................ 340/539.13; 340/572.1
(58) Field of Classification Search .............. 340/539.13
See application file for complete search history.

(56) References Cited

U.S. PATENT DOCUMENTS

| | | | |
|---|---|---|---|
| 5,719,586 A | | 2/1998 | Tuttle |
| 5,892,441 A * | | 4/1999 | Woolley et al. .......... 340/539.26 |
| 6,445,297 B1 | | 9/2002 | Nicholson |
| 6,977,579 B2 | | 12/2005 | Gilfix et al. |
| 7,142,120 B2 | | 11/2006 | Charych et al. |
| 7,256,681 B1 | | 8/2007 | Moody et al. |
| 7,257,108 B2 | | 8/2007 | Cheston et al. |
| 7,830,257 B2 * | | 11/2010 | Hassell ....................... 340/572.1 |
| 2005/0242959 A1 * | | 11/2005 | Watanabe .................. 340/572.7 |
| 2006/0273905 A1 * | | 12/2006 | Choi et al. ................. 340/572.1 |
| 2008/0272887 A1 * | | 11/2008 | Brey et al. ..................... 340/10.1 |
| 2010/0039284 A1 * | | 2/2010 | Hall et al. ................. 340/825.36 |

OTHER PUBLICATIONS

Hae Don Chon, Using RFID for Accurate Positioning, 2004 International Symposium on GNSS/GPS, Dec. 6-8, 2004, pp. 1-10.

* cited by examiner

*Primary Examiner* — George Bugg
*Assistant Examiner* — Kerri McNally
(74) *Attorney, Agent, or Firm* — Arthur K. Samora; Kyle Eppele

(57) ABSTRACT

An object localization and tracking system includes a plurality of tags that are placed on respective objects. Each tag includes a transceiver and at least three orthogonal antennas to receive RF energy in a three dimensions. The tag transceiver and antennas cooperate with other tag antennas and transceivers to establish a tag (object) RF network. Each tag further includes a microprocessor, and sensors that determine tag position and relative position of other tags in the tag RF network. A user interface is connected to one of the tag microprocessors. A predetermined algorithm, which describes desired positional information for each tag in the RF network (and its corresponding object), is input into one of the microprocessors through the user interface. A tag audible or visual alert activates when the actual positional information of the tag (and the attached object) do not correspond to the desired positional information.

11 Claims, 7 Drawing Sheets

ACTIVE COMPOSITE RFID TAG FOR OBJECT LOCALIZATION AND INSTRUCTION

FEDERALLY-SPONSORED RESEARCH AND DEVELOPMENT

This invention (Navy Case No. 099150) is assigned to the United States Government and is available for licensing for commercial purposes. Licensing and technical inquires may be directed to the Office of Research and Technical Applications, Space and Naval Warfare Systems Center, Pacific, Code 72120, San Diego, Calif. 92152; voice (619) 553-2778; email T2@spawar.navy.mil.

FIELD OF THE INVENTION

The present invention pertains generally to a system and method for gaining information about spatial relationships between a plurality of objects. More specifically, the present invention pertains to a system for gaining information about the objects by placing an active radio frequency (RF) tag on each object to establish an RF network for the objects, and further by specifying the object's location in the RF network with respect to a frame of reference that is defined by the other objects in the RF network.

BACKGROUND OF THE INVENTION

There are many systems in the prior art that describe spatial relationships between a plurality of objects. There are also systems that provide usage and assembly instructions for pluralities of objects. Many of these systems use paper labels affixed to or associated with objects to convey to users the identifying information and use of the objects. These paper labels are often passive and offer no information on the actual state of the objects, such as location in space, or motion through space. The labels can also become disassociated with the objects, contributing to loss of information or to confusion in the user.

Recently, radio frequency identification (RFID) tags have replaced paper labels in some of these applications to permit remote access to the label information. But prior art RFID applications require the use of an RFID tag reader, and the RFID tags can provide location information only in reference to the known location of an RFID tag reader, and only within a sphere with radius defined by the RF range of the tag transceiver. The RFID tags can neither provide state nor dynamic information, so the user must derive this information using other sensors and methods external to the tags. The principal method has been visual inspection by the user, but this method suffers from the perceptual limitations of users who often experience difficulties recognizing the static relationships of objects, and who generally experience difficulties with the recognition of dynamic relationships. This is particularly true when the user is trying to learn how to accomplish a new or different task.

In view of the above, it is an object of the present invention to provide an RF-network enabled system for the labeling, localization and tracking of a plurality of component part objects. Another object of the present invention is to provide an RF-enabled network system of tags that combine sensors with logic elements on each tag. It is another object of the present invention to provide an RF-network enabled tracking system that provides feedback to users on the proper alignment and assembly procedures of networked objects that are being tracked. Yet another object of the present invention is to provide an RF-network enabled system that allows for input of a predetermined algorithm as to a desired orientation of a plurality of tracked objects. Still another object of the present invention is to provide an RF-network enabled system that functions as a training aid that facilitates the learning of a new language by providing audible feedback on the names of objects that the respective RFID tags are affixed to. Another object of the present invention is to provide a RF-network enabled system that uses RFID tags with logic and processing capabilities to allow for input or training aid for the physical arts such as dance, and sports such as golf, swimming, or tennis. Yet another object of the present invention is to provide a RF-network enabled tracking system that uses RFID tags combined with logic and processing capabilities to function as a physical aid to the visually impaired.

SUMMARY OF THE INVENTION

A system and methods for localization and tracking of objects in accordance with several embodiment of the invention includes a plurality of tags, with at least one tag corresponding to a respective object. Each tag includes a transceiver and at least three antennas. The antennas are oriented orthogonally in several embodiments to receive RF energy in a three dimensions. Each tag further includes a transceiver. The transceivers and antennas for each tag cooperate to establish an RF network for the tags (and the corresponding objects that tags are attached to).

For the systems and methods according to several embodiments of the invention, each tag can further include a microprocessor, and an accelerometer and an ultrasonic rangefinder that are connected to the microprocessor. The accelerometer transmits changes in dynamic positional information of the object to the microprocessor, for further transmission over the tag RF network via its respective transceiver and antenna network.

The system and methods according to several embodiments of the present invention can further include a user interface that is connected to at least one of the tag microprocessors. A predetermined algorithm, which can describe a desired position, velocity and acceleration for each tag in the RF network (and the corresponding object it is attached to), can be input into one of the tag microprocessors through the user interface. In several embodiments, the tags can further include an alert means, which activates when the actual position, velocity and acceleration of the tag (and the attached object) does not correspond to a desired position, velocity and acceleration that is defined by the predetermined algorithm. The alert means can be a light emitting diode (LED), speaker, audible alarm or vibrator.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

In brief overview, the present invention extends the capabilities of prior art examples of radio frequency transponder tagged objects by combining sensors and logic elements on the tags. This combining action results in formation of an ad-hoc RF-enabled network of transceivers, hereafter called active composite radio frequency identification (AC RFID) tags, affixed to physically independent objects in order to gain information on object identity, state, dynamic and geometric relationships within the frame of reference composed of similarly networked objects. The AC RFID tags are affixed temporarily or permanently to various objects in a collection and pass data among them via the ad-hoc network after an inquiry by a user, or after a change in the physical configuration of the network.

A user can interrogate the ad-hoc network using a user interface, in a fashion similar to the interrogation of a single RFID tag by a user employing an RFID tag reader. The user interface of the present invention contains all of the functionalities of the AC RFID tag plus input and output functions that permit a user to interact with the local AC RFID network, either directly or indirectly, and further with a larger network such as the Internet. Data processing capabilities on the user interface are tailored to specific applications, described below for a sample of exemplary applications. These data processing capabilities enable users to take advantage of the information gained from the distribution and/or movement of objects that are linked to data files in a data repository. In some applications, the user interface serves as the data repository, while in other applications, the data repository is external to the user interface, as described more fully below.

The integration of sensor information, including the directional antennas, with logic elements in the AC RFID tag permits all of the additional capabilities described herein. The capabilities will depend in addition upon data analysis algorithms that will in general reside on the user interface. The algorithms will process the data flowing to the user interface from the network of AC RFID tags. The user interface algorithms will vary somewhat from application to application, though core functions that calculate proximity and direction, and motion will be common. Minimal computations will be performed on the AC RFID tags. These algorithms will process antenna signals to determine the largest signal, and thus provide one indicator of the direction of the source. Source range can then be determined by the integration of ultrasound travel times and RF cues, also processed at the AC RFID.

Figure 1:
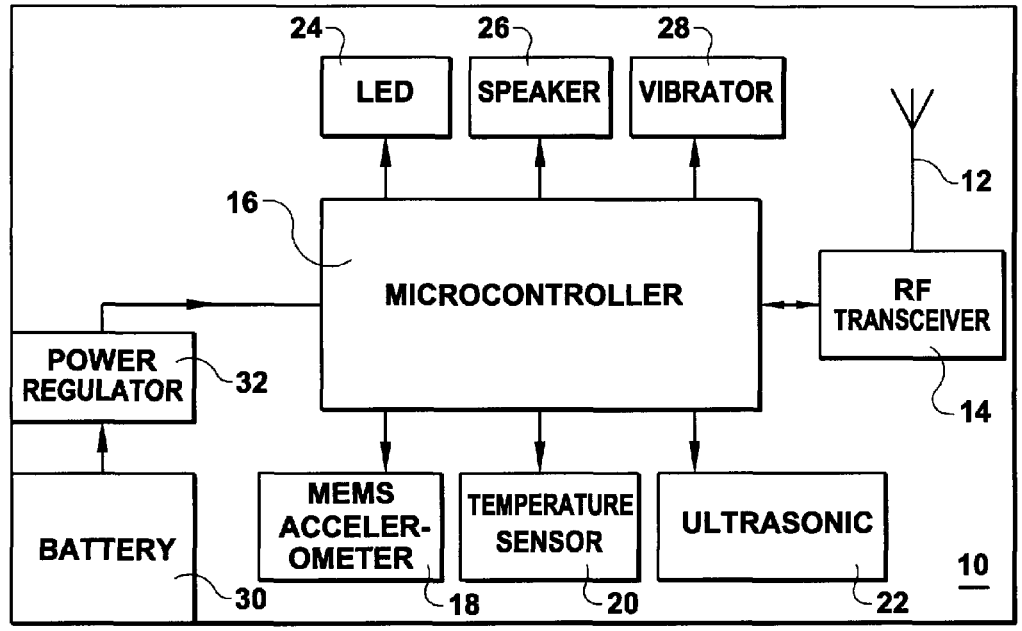
FIG. 1 is a diagram of an active composite radio frequency identification (AC RFID) tag according to several embodiments of the present invention.

Referring now to FIG. 1, FIG. 1 shows the components and connectivity of an AC RFID tag 10. The AC RFID tag includes orthogonal directional antennas 12 in three major spatial dimensions; the antennas 12 are connected to RF transceiver 14. Transceiver 14 is connected to a microprocessor 16, as shown in FIG. 1; one such microprocessor can include an integrated circuit computer with memory capabilities. The AC RFID tag according to several embodiments further includes a micro-electromechanical system (MEMS) accelerometer 18 for determining orientation of tag 10 with respect to gravity and with respect to other axis accelerations, temperature sensor 20 and omni-directional ultrasonic range estimators 22. Accelerometer 18, sensor 20 and range estimator 22 are all connected to microprocessor 16, for providing inputs thereto.

Each tag 10 further includes a light emitting diode (LED) 24, or other low energy-requirement light emitting substance, and can further include a sound generation elements such as a speaker 26, and silent alert means such as a vibrator 28. LED 24, speaker 26 and vibrator 28, in cooperation with a keyboard (not shown), can also function as a user interface 34 in a manner described more fully below. To provide a steady source of power, each AC RFID tag further includes a battery 30 that is connected to processor via a power bus (not shown) and power regulator (32). The battery is internal to the tag 10; it should be appreciated, however, that an external power source could also be used.

Figure 2:
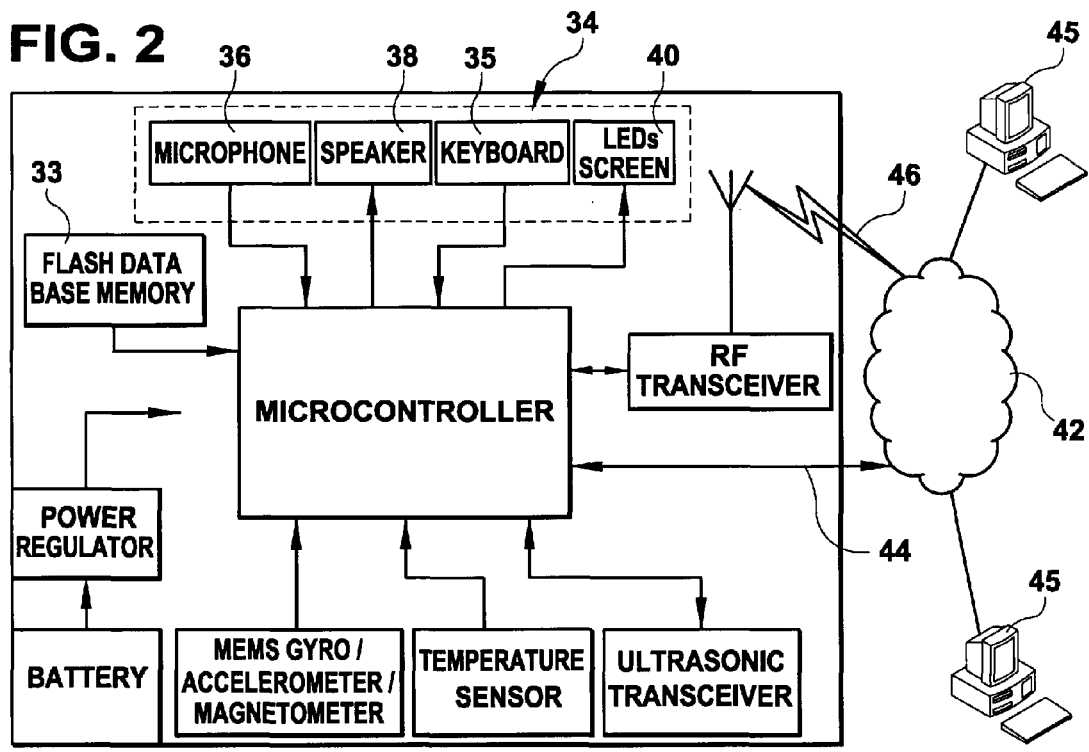
FIG. 2 is a diagram that illustrates the AC RFID tag of FIG. 1 when connected to a network.

FIG. 2 further shows the hardware component architecture of user interface 34, according to several embodiments of the present invention. The user interface 34 can function to initialize any new AC RFID tags 10 that are not pre-initialized by an AC RFID tag provider (i.e. Initialize any new tags that are added to the AC RFID tag network, if corresponding objects are added to the network). The user interface function can also interrogate and read the information provided by the tags during operation of the system, and transmit data/information pertaining to the object that the tag is attached to. The microcontroller 16 for tag 10 can provide for robust data analysis, drawing data from non-volatile internal memory 33 and data that have been transmitted from other AC RFID tags on the RF network.

The user interface 34, in addition to hosting all components and all functions of the AC RFID tags, also provides the input and output functions required by a human operator that are required for connectivity to an extended external network for data and other control requirements. The user interface requirements include input devices such as a keyboard 35 and a microphone 36; output devices such as an audio speaker 38 and a touch sensitive video screen 40.

According to several embodiments of the invention, user interface 34 may be constructed so that it is internal to tag 10, so that tag 10 function much like an iPhone with a touch screen. Or, the user interface may remotely connected to tag 10 and to a remote database 45 via a hardwire connection 44 or wireless connection 46, for access to the internet or to another local area network 42. The core logic functions on the user interface include the definition of the RF network configuration, the recall of tagged object-specifications, the definition of the relative object configurations and the determination of relative object dynamics within the configuration. All of these logic functions can be selectively input into the tag (and by extension, the AC RFID network) in a manner more fully described below.

Figure 3:
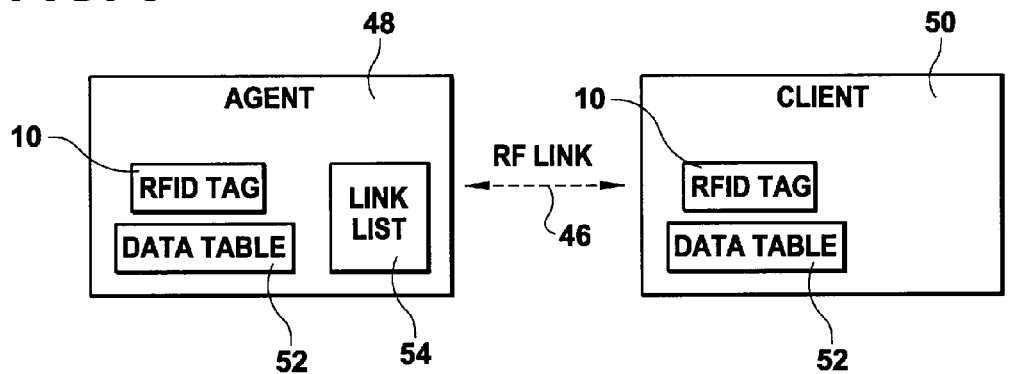
FIG. 3 is a diagram of two AC RFID tags in a networked nodal configuration with one node shown in an agent configuration and one node shown in a client configuration.
Figure 4:
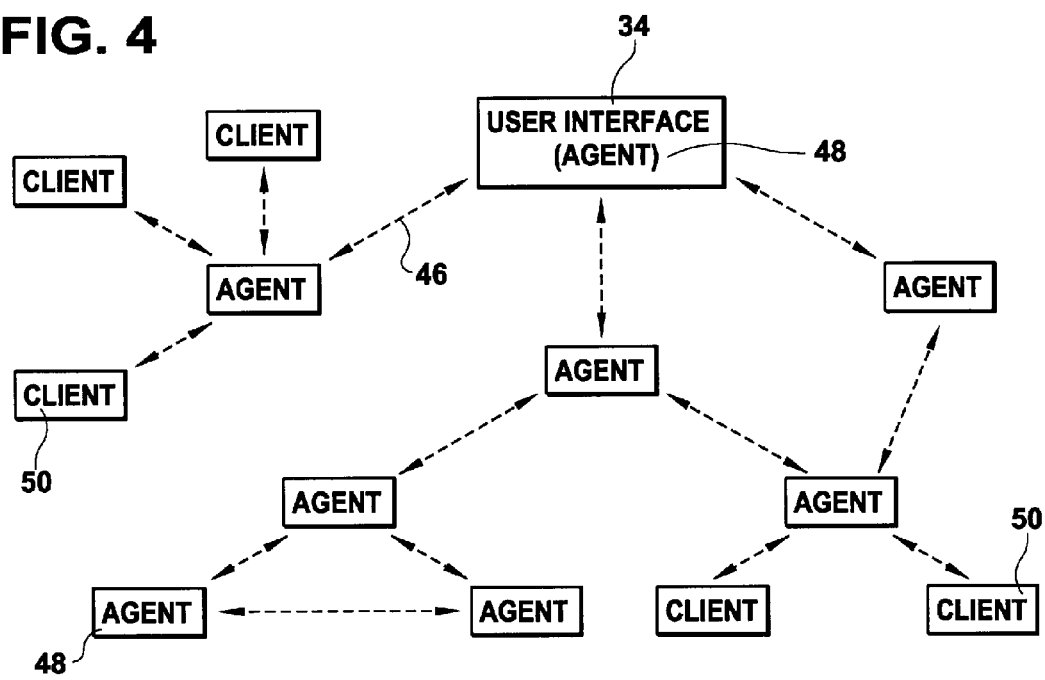
FIG. 4 is a diagram of multiple AC RFID agent nodes and client nodes in an extended tag network.

Referring now to FIGS. 3 and 4, FIGS. 3-4 demonstrate how a plurality of nodes in the AC RFID network can be configured to be an agent node 48 or a client node 50 within the AC RFID network. Both agent node 48 and client node 50 include a data table 52 and a generated link list 54. FIG. 3 shows an AC RFID network in which some nodes are configured as agent nodes 48 while other nodes are configures as client nodes 50. In some applications, all nodes would be configured as agent nodes. In other applications, some nodes could be configured as client nodes. In other networks, nodes could switch between agent or client roles as the physical configuration of the network changes, and as the operational requirements change.

In general, under dynamic conditions and where accurate position and velocity information are required from the network, nodes should function as agents. In applications where only location proximity to fixed objects is required, several client nodes associated with a few agent nodes may suffice. For example, an agent node 48 may be affixed to large objects or to static objects, such as a table or wall, providing references for client nodes associated with them. The use of client nodes simplifies network communications and reduces energy expenditures under static or predictable conditions. Each client node 50 can only exchange information with a nearby agent node 48, while the agent nodes 48 can communicate with other agent nodes 49 in RF range as well as with a select group of client nodes 50 in RF range. Agent nodes 48 perform RF scanning periodically to find which other agents and clients are in their RF range and store link information to those nodes into their link list 52 in FIG. 4.

FIG. 4 shows the structure of agent nodes 48 and client nodes 50 in an extended AC RFID network more fully. A client node 48 consists of a unique RFID tag 10 and a data table 52, which holds current status information of the client tag, such as RF signal strength, orientation, and temperature. The agent node 48 further includes a link list 54 in addition to the data table 52 of a client node 50. Link list 54 provides links to other agent nodes and client nodes in RF range area. In transitioning from a role as a client node to a role as a agent node, the AC RFID attempts to link with all other AC RFID nodes in range (FIG. 4 illustrates a wireless connection 46), and to create a link list through which information can be routed, and with which network RF and physical configurations can be defined. It should also be appreciated that agent nodes and client nodes can be manufactured so each node includes an RFID tag 10, a data table 52 or link list 54. The link list is activated for agent nodes; it is not activated for client nodes.

Figure 5:
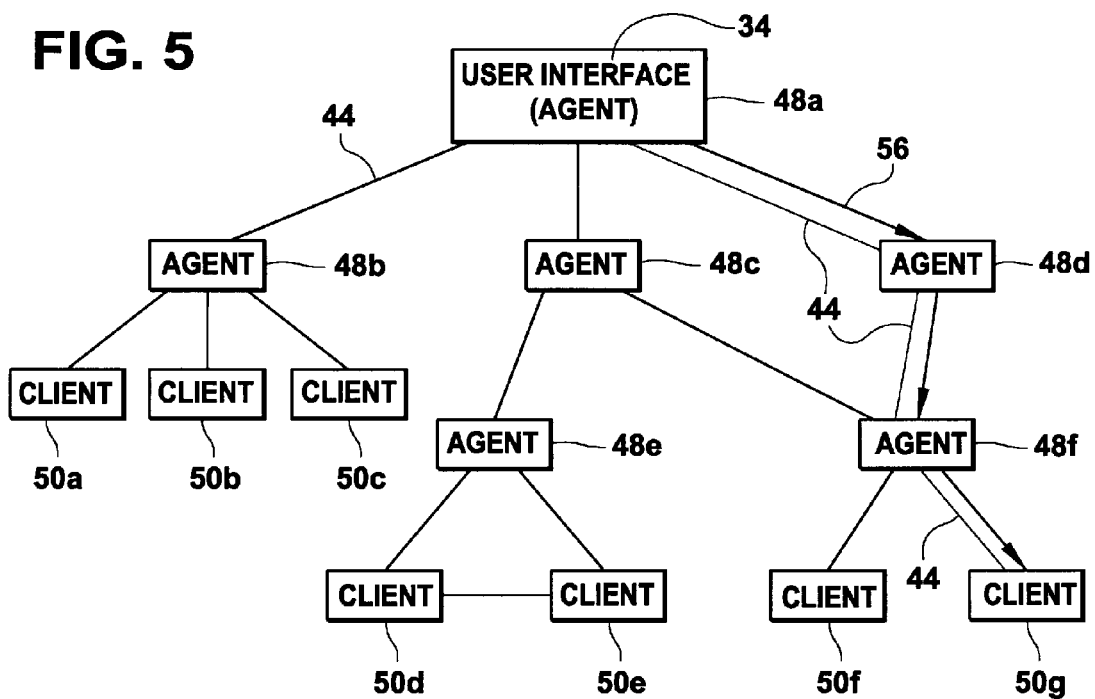
FIG. 5 is the same AC RFID network as FIG. 4, but a network communications path shown to an exemplary client AC RFID node shown.

FIG. 5 illustrates how user interface 34, agent nodes 48 and client nodes 50 cooperate to form an AC RFID network. When user interface 34 wants to know the current information status of a specific agent node 48 or client node 50, such as signal strength and orientation of client node 50$g$, it will look at link list 54 (See FIG. 4) of agent nodes 48$a$-48$f$ and assemble a route 56 to a specific agent node or client node of interest (in this case, client node 50$g$). Then user interface 34 can establish a route 56 to the client node 50$g$ through agent nodes 48$d$, 48$f$ and read current status information from data table 52 for client node 50$g$ (data table 52 is not shown in FIG. 5, please see FIG. 4). The routing process also provides information about the region in which the agent or client is located. In this case, information is provided on surrounding agent nodes 48$d$, 48$f$ and client node 50$f$, which are in the same vicinity as client node 50$g$. Alternatively, the AC RFID network can continuously update the user interface with agent and client data with which programs running on the user interface can calculate the network configuration and the dynamics of its nodes.

Figure 6:
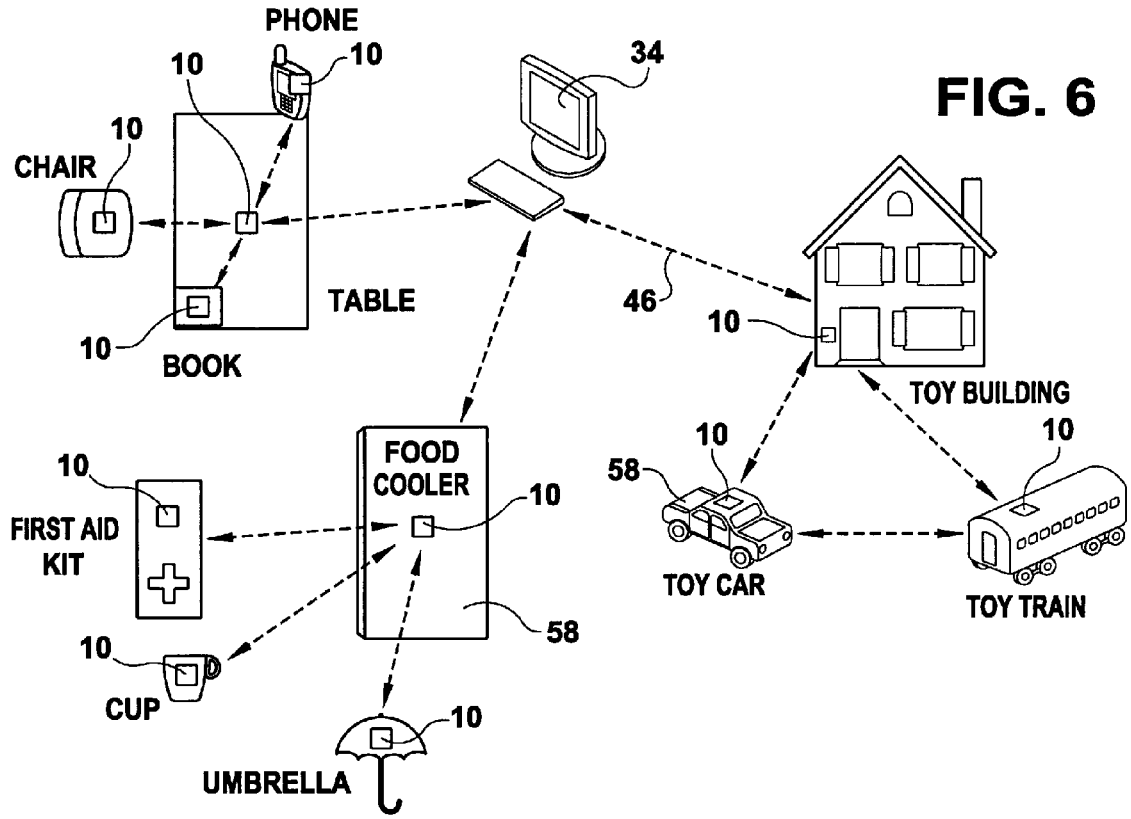
FIG. 6 is a diagram of the AC RFID tag network according to several embodiments of the present invention in an operational configuration, which illustrates how each tag can be attached to a respective object for localization and tracking and to describe object relative orientation once the AC RFID network is initialized.

FIG. 6 shows how the logic of the networked AC RFID tags enable collective information generation from a group of communicating AC RFID tags 10 once the tags are applied to objects 50. In general, AC RFID tags 10 that are specific to different objects (e.g. vase, book, plate, photograph, table, chair, wall, floor, door, toy, musical instrument, tennis racket, jacket, wheel, etc.) are temporarily or permanently affixed to those objects. Each AC RFID tag 10 corresponds to a respective object 58, as shown in FIG. 6. The AC RFID tags 10 establish an ad-hoc RF network among themselves and with user interface 34 (in FIG. 6, user interface 34 is external to tags 10).

Because sensors (i.e. antennas, transceivers and rangefinders) and logic (through microprocessor 16) are integrated into each AC RFID tag 10, the AC RFID network architecture provides relative location information for each tagged object, and as the objects are moved, the updates to the relative location information provide information on the dynamics of the network components. The AC RFID tags assemble a representation of their actual configuration (and by extension, the actual position of the object 58 the tags 10 are attached to) using logic and data derived from the intercommunications on the AC RFID network. One example of the logic is as follows:

1. Tags recognize the acceleration of gravity
2. Tags broadcast a request for a response from the neighborhood
3. The strengths of the signals on the six receiving antennas are used to calculate the probable direction (azimuth and elevation) of the first responding tag.
4. The ID and direction of the first responding tag is placed on the link list of connections
5. The requesting tag then broadcasts as second request for a response from the neighborhood excusing a response from the first responding tag.
6. Steps 3, 4, and 5 are repeated until all tags have received and isolated responses from all other tags within RF range
7. Tags notify each neighboring tag in turn that an ultrasonic sound pulse will be sent, followed by the sending of the pulse, and the initiation of clock ticks in the first tag
8. Upon receipt of the sound pulse, the second tag initiates a pulse
9. Upon receipt of the second sound pulse, the first tag stops its clock and records the time, calculating distance to the second tag as (time multiplied by the speed of sound, divided by two).
10. Tag to tag azimuth, elevation, and distance data are sent to the user interface for configuration of the network components.

In this manner, the AC RFID tag is initialized and the actual positional configuration of the tags 10 (and objects 58) relative to other AC RFID tags 10 (and objects 58) is described.

Figure 7:
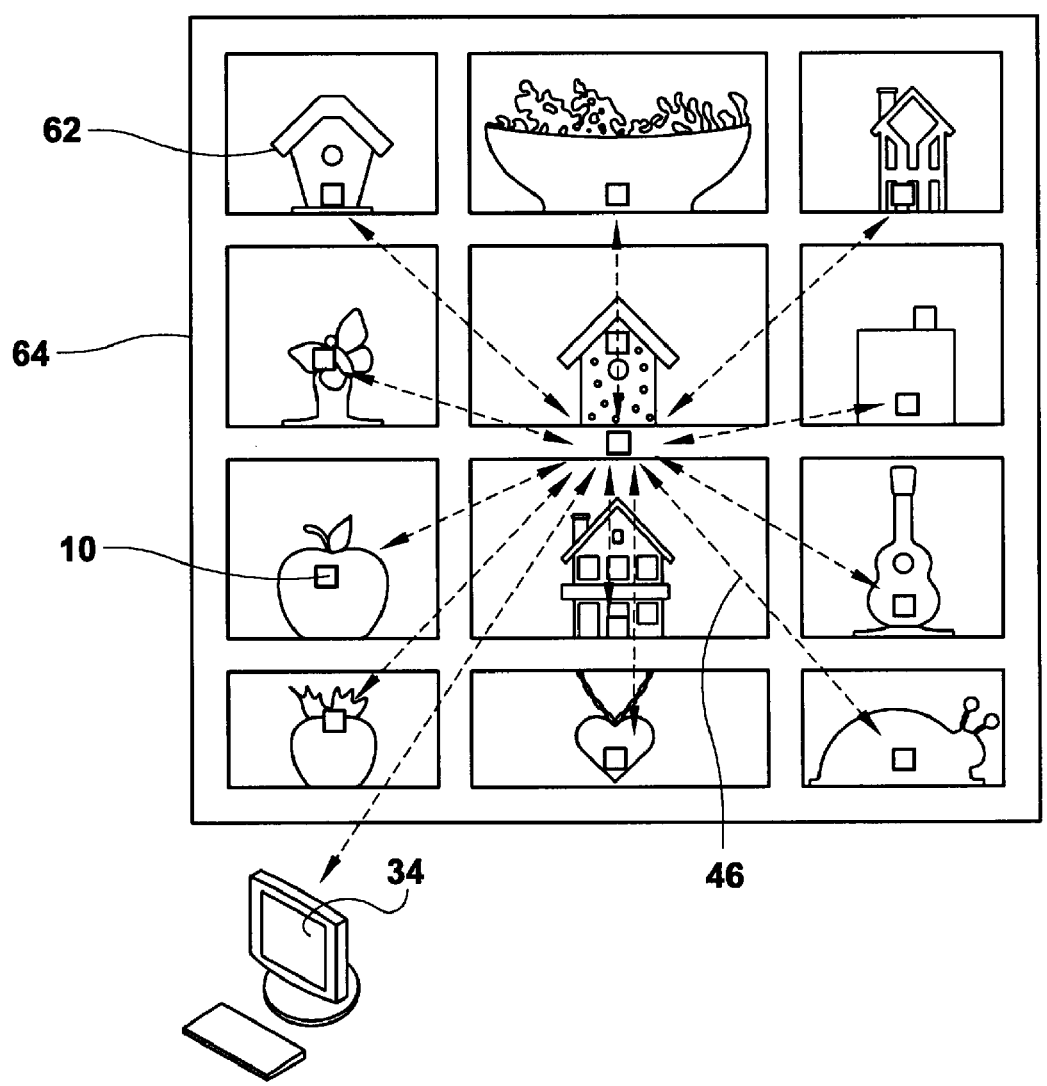
FIG. 7 is the same diagram of FIG. 6 with the AC RFID tags placed on a plurality of objects according to predetermined algorithm that describes a desired static, spatial orientation of the objects.

Once the AC RFID network is initialized and the initial orientation of the objects is determined, as described above, a predetermined algorithm can be input into the AC RFID network via user interface 34 to describe a desired position of the objects. In FIG. 7, the processes involved in the use of the present invention describe the preferred static position of artifacts 62 in a museum/product display 64. Setup involves the manual affixing of the AC RFID tags 10 to artifacts 62 of interest, and the entry of pertinent information (i.e., the desired position of each artifact 62 in the display) is input into the museum or vendor's database (the database is not shown in FIG. 7). Upon enabling of the AC RFID network, the locations of neighboring artifacts 62 are recognized and linked through the AC RFID network into a remote database 45 (as well as to other tags 10 within RF range of each other).

Once setup is complete, interrogation of one artifact 62 can evoke information about the locations of (or disappearance of) other related artifacts 62. This would provide an ad-hoc security procedure in which artifacts 62 would keep track of other neighboring artifacts 62 and report disturbances to the normal configuration of the displays via visible or audible means as described above. The user can browse the collection gathering pertinent information on demand from each object visited by RF interrogation. Such information would be presented via the user's interface 34 and may draw upon a larger remote database 45 connected to a remote network 42 as shown in FIG. 2.

Figure 8:
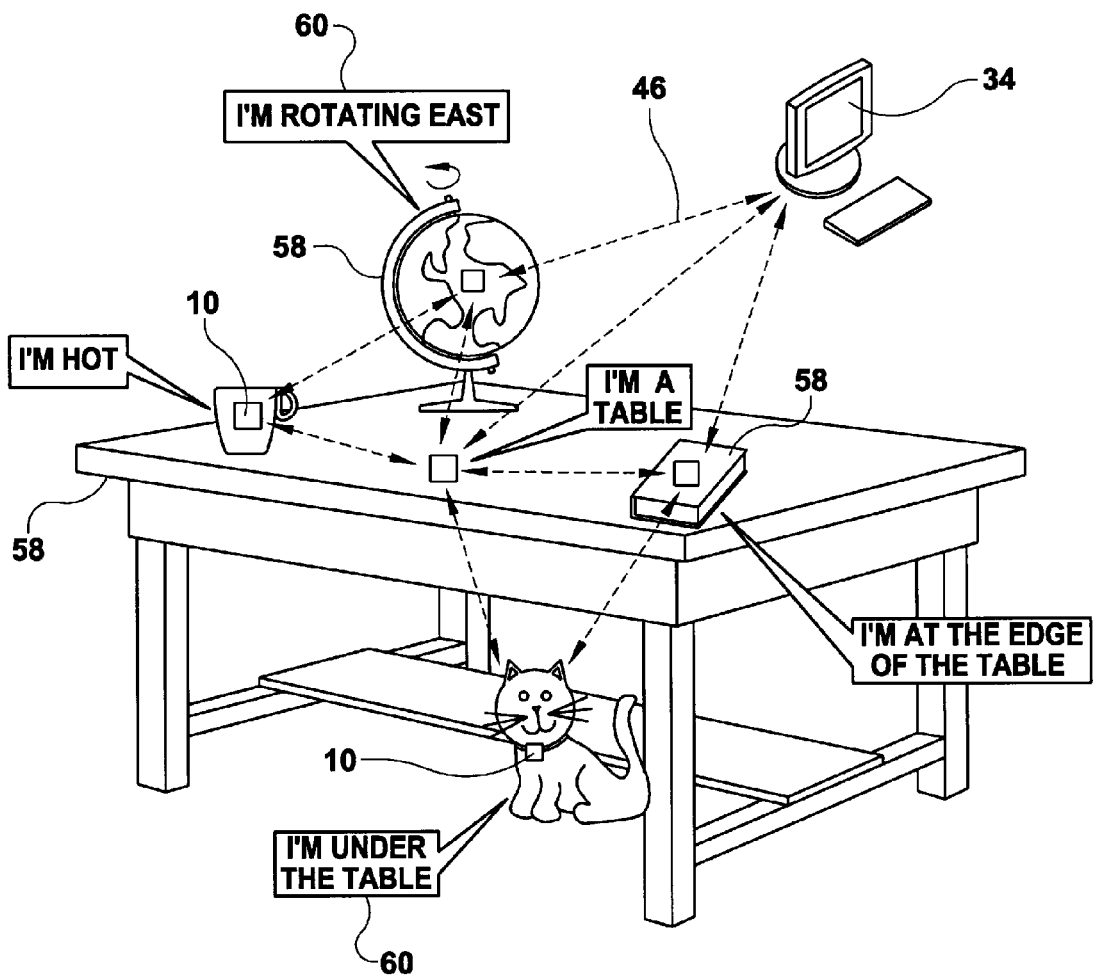
FIG. 8 is the same diagram as FIG. 7, but with an additional audible feedback capability of the AC RFID tags according to several embodiments of the present invention depicted.

FIG. 8 illustrates how, for several embodiments of the present invention, the predetermined algorithm can be used to cause the tags 10 to function as a language instruction aid, or as an aid to the visually impaired. After set up and initialization of the AC RFID network, when the user (student, not shown, who is equipped with a user interface 34) approaches an object, the object's corresponding AC RFID tag 10 will transmit its code to user interface 34. User interface 34 will recall the object's name and other pertinent information based on the code from the database and output that information using the user's output device. The output language may be configured by the user to be that of the input language or translated into any other language that the user is attempting to learn. Simultaneously the object's AC RFID tag 10 will activate its light-emitting element or acoustic sounder to attract attention. The user interface 34 may in response produce an auditory statement (depicted by reference character 60) containing the information linked to the object's code, and/or present the information on its visual display of the user interface 34. Or, if tag 10 equipped with a speaker 26 (see FIG. 1) the auditory statements may be present at the tag via speaker 26.

When an object is moved, the corresponding AC RFID tag 10 and internal sensors (i.e. accelerometer 18) determine the type of movement, and output a signal indicative of that movement to tag microprocessor 19, for further transmission to user interface 34 via tag antenna 12 and tag RF transceiver 14, that in turn produces an auditory statement at the user interface 34 that describes the object and its movement, e.g, "I am a book, I am being moved."; "You are rotating the book."; or. "I am a Teddy Bear, and I am getting dizzy from all of this turning." The auditory statement can also be shown on the visual display of the user interface 34.

As one object 58 is moved in the proximity of another object, the two object AC RFID tags 10 communicate their identities. The directional antennae 12 on the AC RFID tags 10 provide additional information on the relative direction (and orientation) of AC RFID-equipped objects 58 within RF range of the tag AC RFID network. The data flowing from the network of AC RFID tags 10 to user interface 34 permits relationships to be deduced by the user's interface 34, thus allowing for the addition of prepositions and verbs of motion to the language training process, e.g. "I am a book placed down upon on a table."; "I am a chair resting next to the wall."; or, "I am a cup banging on a plate on the table." The addition of prepositions can be written into the predetermined algorithm.

Figure 9:
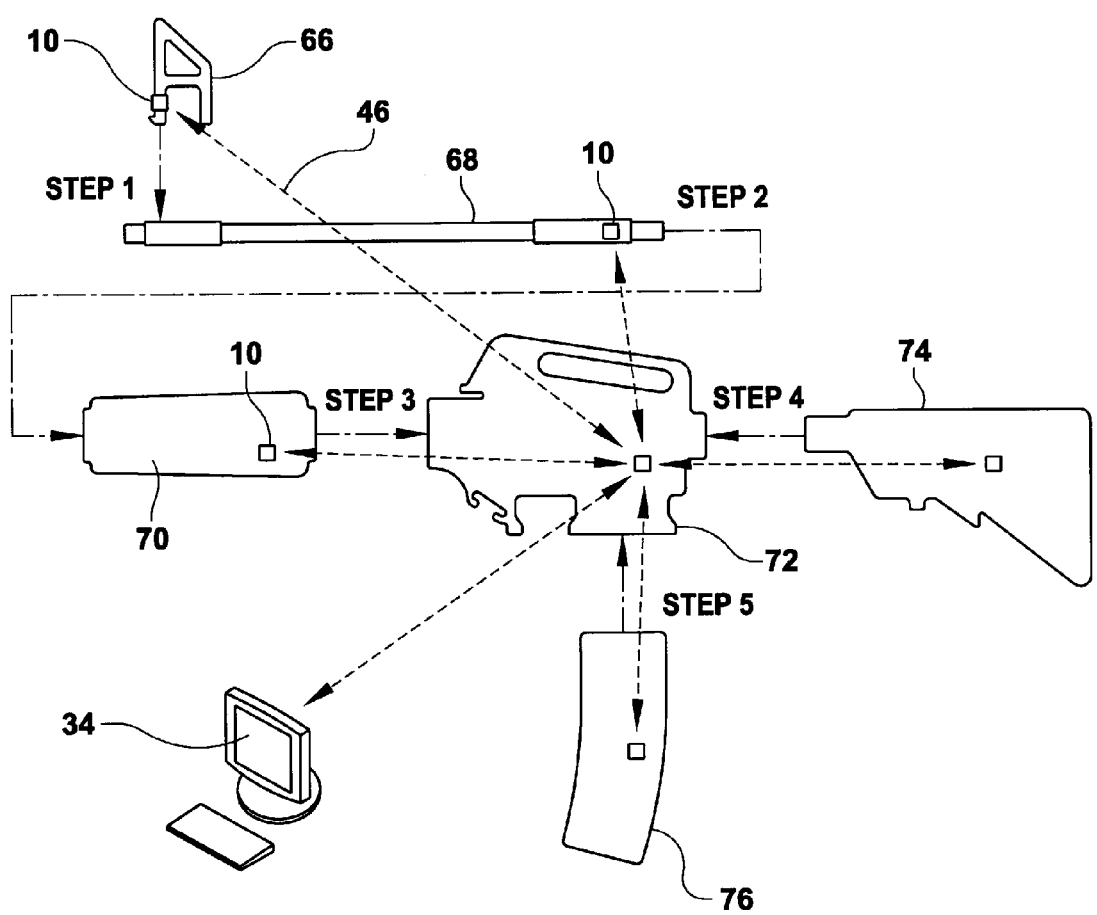
FIG. 9 is the same diagram of FIG. 6, but with the tags placed on objects and with a predetermined algorithm describing assembly instructions for the objects depicted; and, FIG. 10 is the same diagram of FIG. 6, but with the AC RFID tags being placed on portions of a user's body and with an predetermined algorithm depicted that describes a desired dynamic orientation, such as the proper motion of the user's arms, legs, etc. for playing table tennis.

In similar fashion, the processes described above can be used for object location to assist the visually impaired. To do this, the system is initialized as described above. When the user (not shown) who is equipped with a user interface 34 approaches an object 58, the object AC RFID tag 10 will transmit its information to the user interface 34 and user interface can output that information audibly, as described above. Alternatively, the user may request the location of an object 58 via verbal input to user interface 34. The tag 10 on the requested object 58 could then respond with its positional and state information relative to the user interface (and the user) and with relational information, e.g. "Your book is on the edge of the table."; or "The cup is on the table, and it is hot." In this manner, the system and methods of several embodiments of the invention can be used to assist the visually impaired user FIG. 9 shows how the predetermined algorithm according to several embodiments of the present invention can be used to describe the preferred orientation of component parts in a manner which functions as interactive assembly instructions. As shown in FIG. 9, AC RFID tags 10 can be attached to component parts prior to manual assembly of those parts. During assembly operations, the AC RFID network of tags 10 would establish an AC RFID network and transmit information to each other and to user interface 34 as described above. User interface 34 could monitor the assembly, progress, the orientation and the movement of objects. User could further advise the user on the sequence of assembly steps, and correct any errors in assembly procedures as the errors occur.

For example, and as shown in FIG. 9, step one of the complex assembly of a gun could involve insertion of gun sight 66 into barrel 68. Step 2 requires insertion of barrel 68 into flash suppressor 70. It may happen that gun sight 66 must be inserted into barrel 68 before any other component parts of the gun are assembled; otherwise, the gun will not operate properly. The predetermined algorithm could describe a specific static relationship between tag 10 on gun sight 66 and tag 10 on barrel 68 that must exist before any of the static relationships between any other component parts of the gun exist. Otherwise, the alerting means (LED's 24, speaker 26 or vibrator 28) of tag 10 activate to alert the user that the gun is being assembled incorrectly (or an alert at user interface 34 could activate based on a AC RFID network signal send from the AC RFID network). Similarly, the predetermined algorithm can ensure that steps 2 through 5 (attachment of flash suppressor 70 to chamber 72, or chamber 72 to stock 74 and insertion of magazine 76 into chamber 72) are accomplished in sequence. In this manner, complex assembly maneuvers can be monitored and guided by the user interface 34.

Figure 10:
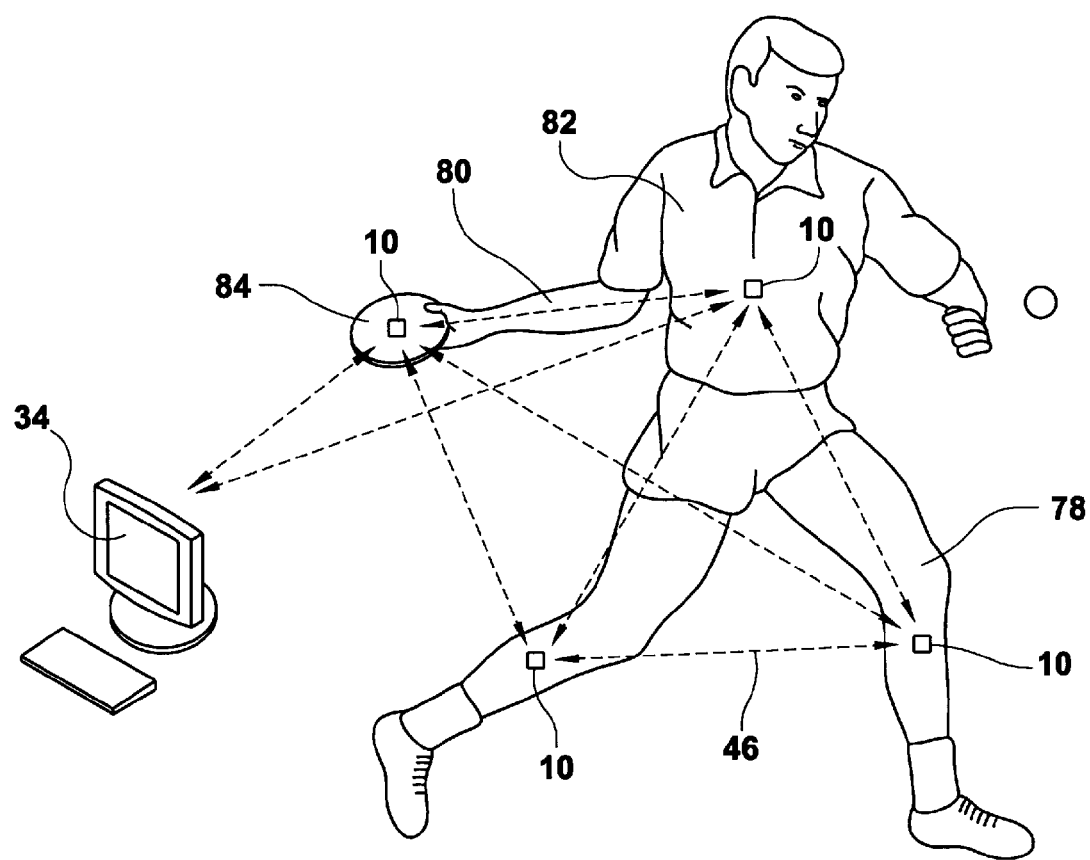

FIG. 10 shows processes according to several embodiments of the invention wherein the predetermined algorithm can describe a preferred dynamic orientation of objects. This allows the system in several embodiments to function as a training aid for sports such as dance, gymnastics, golf, swimming, or tennis, etc. As shown in FIG. 10, set up would entail the attachment of AC RFID tags 10 to key objects for a particular task. For the task shown in FIG. 10 (table tennis), it is desired to monitor the initial position and motion of the users knees 78, hand 80, torso 82 and position and orientation of the sports equipment (paddle 84 in FIG. 10).

The training program (predetermined algorithm) embedded into the system via user interface 34 would monitor the relationships among the AC RFID tags 10 of the users knees 78, arm 80, torso 82 and paddle 84 (for this embodiments, the tags are not permanently attached to the objects, i.e. knees 78, arm 80, torso 82 or paddle 84), to ensure that the positions and velocities of the tagged parts are appropriate for the actions required of the user. The initial templates for these actions required to generate the predetermined algorithm may be established by copying the actions performed by an expert wearing a similar configuration of AC RFID tags 10, or by the user wearing the AC RFID tags 10 whose motions were under the guidance of a teacher.

During operation, the user interface 34 would monitor the dynamics of the network of AC RFID tags 10 worn by the user and attached to equipment (paddle 84) and periodically make recommendations to the user to improve form and process to better reproduce the target dynamics. For example, the alert means could activate if the user's feet are to close together as the user hits the ball with paddle 84, or if the user's paddle is coming forward too early or oriented incorrectly, etc. In this manner, the system and methods of several embodiments can be used to instruct the user on the accomplishment of a dynamic task.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All systems and methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

What is claimed is:

1. A system for localization and tracking of objects, said system comprising:
   a plurality of tags;
   each said tag including a transceiver and at least three antennas, said antennas being oriented in a three-dimensional configuration, said transceivers and said antennas cooperating to establish an RF network for said tags;
   each said tag including a microprocessor;
   each said tag being placed on a respective object, each said tag further communicating information pertaining to said respective object to at least another of said tags via said RF network;
   a user interface connected to at least one of said microprocessors; and,
   a predetermined algorithm input into the at least one of said microprocessors through said user interface, said algorithm describing a desired position, velocity and acceleration for each said object in said RF network.

2. The system of claim 1, wherein each said tag further comprises an accelerometer connected to said microprocessor for transmitting changes in velocity information of said object to said microprocessor, for further transmission over said RF network.

3. The system of claim 1, wherein each said tag further comprises an ultrasonic rangefinder connected to said microprocessor, said ultrasonic rangefinder determining range information to other said tags and providing said range information to said microprocessor for further transmission over said RF network.

4. The system of claim 3, wherein said RF network is connected to an external network, and further comprising: an external user interface connected to said external network.

5. The system of claim 1, each said tag further comprises an alert means, and further wherein each said microprocessor for each said tag compares an actual position, velocity and acceleration for its respective said object to said desired position, velocity and acceleration for said tag, according to said algorithm; and,
   said alert means activating when said actual position, velocity and acceleration does not correspond to said desired position, velocity and acceleration.

6. The system of claim 5, wherein said alert means is selected from the group consisting of a light emitting diode (LED), speaker and vibrator.

7. A method for localization and tracking a plurality of objects, said method comprising the steps of:
   A) providing a plurality of tags, each said tag including a transceiver and at least three antennas oriented in a three-dimensional configuration;
   B) incorporating a microprocessor into each said tag;
   C) establishing an RF network for said tags with said transceivers and said antennas;
   D) placing a respective said tag on a corresponding said object;
   E) communicating information pertaining to each respective said object to at least another of said tags in said RF network;
   F) connecting a user interface to at least one of said microprocessors; and,
   G) inputting a predetermined algorithm into the at least one of said microprocessors through said user interface, said algorithm describing a desired position, velocity and acceleration for each said object in said RF network.

8. The method of claim 7, wherein said step B) further comprises the step of:
   B1) connecting an accelerometer to said microprocessor for transmitting changes in velocity information of said object to said microprocessor, for further transmission over said RF network via said step E).

9. The method of claim 8, wherein said step B) further comprises the step of:
   B2) connecting an ultrasonic rangefinder to said microprocessor, said ultrasonic rangefinder determining range information to other said tags; and,
   B3) providing said range information to said microprocessor for further transmission over said RF network.

10. The method of claim 7, further comprising the step of:
    H) incorporating an alert means into each said tag;
    I) comparing an actual position, velocity and acceleration for each respective said tag, which is indicative of the actual position, velocity and acceleration of said object attached to said tag, to said desired position, velocity and acceleration for said tag, according to said algorithm; and,
    J) activating said alert means when said actual position, velocity and acceleration do not correspond to said desired position, velocity and acceleration.

11. The method of claim 10, wherein said step H) is accomplished with said alert means selected from the group consisting of an light emitting diode (LED), speaker and vibrator.

* * * * *